(12) United States Patent
Tian et al.

(10) Patent No.: US 9,567,427 B2
(45) Date of Patent: Feb. 14, 2017

(54) PVC/POLYESTER BINDER FOR PRODUCTS

(71) Applicant: ARMSTRONG WORLD INDUSTRIES, INC., Lancaster, PA (US)

(72) Inventors: Dong Tian, Lancaster, PA (US); Gary A. Sigel, Millersville, PA (US); Fang Qiao, Lancaster, PA (US); Rebecca L. Winey, Lancaster, PA (US); Jeffrey S. Ross, Lancaster, PA (US)

(73) Assignee: AFI Licensing LLC, Lancaster, PA (US)

( * ) Notice: Subject to any disclaimer, the term of this patent is extended or adjusted under 35 U.S.C. 154(b) by 123 days.

(21) Appl. No.: 13/875,508

(22) Filed: May 2, 2013

(65) Prior Publication Data

US 2013/0237665 A1  Sep. 12, 2013

Related U.S. Application Data

(63) Continuation of application No. 11/541,976, filed on Oct. 2, 2006, now Pat. No. 8,519,053.

(51) Int. Cl.
 *C08G 63/183* (2006.01)
 *C08L 67/02* (2006.01)
 *C08L 27/06* (2006.01)
 *C08L 67/00* (2006.01)

(52) U.S. Cl.
 CPC ............ *C08G 63/183* (2013.01); *C08L 67/02* (2013.01); *C08L 27/06* (2013.01); *C08L 67/00* (2013.01)

(58) Field of Classification Search
 CPC ................................ C08L 27/06; C08L 67/02
 USPC ....................................................... 525/92 F
 See application file for complete search history.

(56) References Cited

U.S. PATENT DOCUMENTS

| | | | |
|---|---|---|---|
| 2,424,588 A * | 7/1947 | Young ...................... C10M 1/08 | 106/243 |
| 2,625,526 A * | 1/1953 | Sparks et al. ................. | 525/169 |
| 2,820,802 A * | 1/1958 | Sprang .................... C07C 55/02 | 524/308 |
| 2,851,436 A | 9/1958 | Forsythe | |
| 2,891,930 A | 6/1959 | Caldwell et al. | |
| 3,371,061 A | 2/1968 | Pickett | |
| 3,472,775 A * | 10/1969 | Aylesworth ............ C08G 63/42 | 508/492 |
| 3,575,785 A | 4/1971 | McManimie et al. | |
| 3,616,144 A | 10/1971 | Kenney | |
| 3,718,715 A | 2/1973 | Crawford et al. | |
| 3,972,962 A | 8/1976 | Williams et al. | |
| 3,991,005 A | 11/1976 | Wallace | |
| 4,011,358 A | 3/1977 | Roelofs | |
| 4,029,627 A * | 6/1977 | Chang et al. .................. | 524/311 |
| 4,083,824 A | 4/1978 | Harris | |
| 4,161,470 A | 7/1979 | Calundann | |
| 4,163,813 A | 8/1979 | Sheets et al. | |
| 4,184,996 A | 1/1980 | Calundann | |
| 4,267,289 A | 5/1981 | Froix | |
| 4,286,075 A | 8/1981 | Robeson et al. | |
| 4,362,775 A | 12/1982 | Yabe et al. | |
| 4,400,468 A * | 8/1983 | Faber ........................... | 435/142 |
| 4,489,190 A | 12/1984 | Froix | |
| 4,595,626 A | 6/1986 | Brubaker | |
| 4,614,556 A | 9/1986 | Fry et al. | |
| 4,820,763 A * | 4/1989 | Yang ............................. | 524/505 |
| 5,070,157 A | 12/1991 | Isayev et al. | |
| 5,093,435 A | 3/1992 | Harris | |
| 5,244,726 A | 9/1993 | Laney | |
| 5,244,942 A | 9/1993 | Hover et al. | |
| 5,276,082 A | 1/1994 | Forry | |
| 5,340,846 A | 8/1994 | Rotter | |
| 5,349,028 A | 9/1994 | Takahashi et al. | |
| 5,391,612 A | 2/1995 | Johnson | |
| 5,407,617 A | 4/1995 | Oppermann et al. | |
| 5,494,707 A | 2/1996 | Wang et al. | |
| 5,576,367 A | 11/1996 | O'Brien et al. | |
| 5,700,865 A | 12/1997 | Lundquist | |
| 5,723,417 A * | 3/1998 | Kitahara .............. | C08G 63/199 508/455 |
| 5,728,476 A | 3/1998 | Harwood et al. | |
| 5,753,767 A | 5/1998 | Ward | |
| 5,763,501 A | 6/1998 | Bickhardt et al. | |
| 5,798,413 A | 8/1998 | Spelthann et al. | |

(Continued)

FOREIGN PATENT DOCUMENTS

| | | |
|---|---|---|
| EP | 0721829 | 7/1996 |
| EP | 848037 | 6/1998 |

(Continued)

OTHER PUBLICATIONS

Mark, Herman, et al., eds. Encyclopedia of Polymer Science and Engineering, 2nd ed., Polyurethanes; vol. 12, pp. 1-9. J. Wiley & Sons; New York, NY. 1985.

Sherry Heidary and Bernard Gordon III; Hydrolyzable Poly(ethylene terephthalate), Journal of Environmental Polymer Degradation, vol. 2, No. 1, 1994, pp. 19-26.

Ramani Narayan; Biobased & Biodegradable Polymer Materials: Rationale, Drivers, and Technology Exemplars, Presented at the National American Chemical Society, Division of Polymer Chemistry meeting, San Diego (2005); ACS Symposium Ser (An American Chemical Society Publication) 939, Jun. 2006.

Standard Specification for Vinyl Composition Floor Tile(1), ASTM International, Designation: F 1066-04, Published Sep. 2004, pp. 770-774.

Kurian, Joseph V., "A New Polymer Platform for the Future—Sorona from Corn Derived 1,3-Propanediol", Journal of Polymers and the Environment, Apr. 2005, pp. 159-167, vol. 13, No. 2, Springer Science + Business Media, Inc., Wilmington, DE.

Joseph V. Kurian, Journal of Polymers and the Enviroment, A New Polymer Platform for the Future—Sorona.RTM. from Corn Derived 1,3-Propanedoil, pp. 159-176, Issue vol. 13, No. 2 / Apr. 2005.

*Primary Examiner* — Mike M Dollinger

(57) ABSTRACT

A product is provided having a biobased component where the biobased component includes recycle polyester resin and the recycle polyester resin includes polyethylene terephthalate, polybutylene, or polypropylene terephthalate. The biobased component includes a polyester resin where the polyester resin is the co-reaction product of an aliphatic polyester having renewable components and a recycle polyester resin. Included is a composition having a filler and a polymeric binder. The filler includes inorganic biobased filler or recycle thermoset resin based filler.

15 Claims, No Drawings

(56) References Cited

U.S. PATENT DOCUMENTS

| | | | |
|---|---|---|---|
| 5,800,904 A * | 9/1998 | Hallman et al. | 428/156 |
| 5,824,727 A | 10/1998 | Blomkvist et al. | |
| 5,928,754 A | 7/1999 | Kondo et al. | |
| 5,945,472 A | 8/1999 | Duong et al. | |
| 5,997,782 A | 12/1999 | Kopf et al. | |
| 6,017,586 A | 1/2000 | Payn et al. | |
| 6,103,803 A | 8/2000 | Cheung et al. | |
| 6,187,424 B1 | 2/2001 | Kjellqvist et al. | |
| 6,214,924 B1 | 4/2001 | Bieser et al. | |
| 6,224,804 B1 | 5/2001 | Schwonke et al. | |
| 6,254,956 B1 | 7/2001 | Kjellqvist et al. | |
| 6,287,706 B1 | 9/2001 | Simpson et al. | |
| 6,291,725 B1 * | 9/2001 | Chopade et al. | 568/861 |
| 6,356,658 B1 | 3/2002 | Sezan et al. | |
| 6,380,296 B1 | 4/2002 | Inada | |
| 6,469,133 B2 | 10/2002 | Baker et al. | |
| 6,573,340 B1 | 6/2003 | Khemani et al. | |
| 6,617,008 B1 | 9/2003 | Kono et al. | |
| 6,730,709 B2 | 5/2004 | Itoh et al. | |
| 6,869,985 B2 | 3/2005 | Mohanty et al. | |
| 6,911,263 B2 | 6/2005 | Kauffman et al. | |
| 6,921,791 B2 | 7/2005 | Lenox et al. | |
| 7,029,750 B2 | 4/2006 | Takei et al. | |
| 7,160,977 B2 | 1/2007 | Hale et al. | |
| 2002/0132960 A1 | 9/2002 | Haile et al. | |
| 2002/0143083 A1 | 10/2002 | Korney | |
| 2003/0232913 A1 | 12/2003 | Bakule | |
| 2004/0028852 A1 | 2/2004 | Weder et al. | |
| 2004/0197515 A1 | 10/2004 | Shultz et al. | |
| 2005/0013982 A1 | 1/2005 | Burgueno et al. | |
| 2005/0042736 A1 | 2/2005 | San et al. | |
| 2005/0048277 A1 | 3/2005 | Oshilaja et al. | |
| 2005/0079780 A1 | 4/2005 | Rowe et al. | |
| 2005/0136259 A1 | 6/2005 | Mohanty et al. | |
| 2005/0137332 A1 * | 6/2005 | Hale et al. | 525/66 |
| 2005/0137921 A1 | 6/2005 | Shahriari | |
| 2005/0159543 A1 | 7/2005 | Acar et al. | |
| 2005/0164023 A1 | 7/2005 | Davis et al. | |
| 2006/0093826 A1 | 5/2006 | Koeniger et al. | |
| 2006/0106167 A1 | 5/2006 | Shah | |
| 2006/0172118 A1 * | 8/2006 | Han | B32B 21/02 428/156 |
| 2008/0081875 A1 * | 4/2008 | Tian | C08G 63/183 525/165 |

FOREIGN PATENT DOCUMENTS

| | | |
|---|---|---|
| EP | 0861951 | 9/1998 |
| EP | 0974611 | 1/2000 |
| JP | 63270812 | 11/1998 |
| WO | 94/15014 | 7/1994 |
| WO | 94/21721 | 9/1994 |
| WO | 95/17568 | 6/1995 |
| WO | 2004069920 | 8/2004 |

* cited by examiner

PVC/POLYESTER BINDER FOR PRODUCTS

CROSS-REFERENCE TO RELATED APPLICATION

This application is claiming the benefit of prior-filed nonprovisional application Ser. No. 11/541,976, filed Oct. 2, 2006, and entitled "PVC/POLYESTER BINDER FOR FLOORING", the disclosure of which is incorporated by reference in its entirety.

FIELD OF THE INVENTION

The present invention relates generally to the field of surface coverings. More particularly, the present invention relates to surface coverings having a polymeric binder comprising homo-polymer PVC resin and thermoplastic, high molecular weight polyester resin. The polyester resin of the invention comprises renewable components and can be amorphous or crystalline in nature. A product is described that comprises a renewable or recycle content that classifies the product for points under the LEED system for commercial products.

BACKGROUND OF THE INVENTION

Vinyl flooring is a major category of product for residential and commercial construction. Polyvinyl chloride (PVC) is the major polymeric material that functions as binder and imparts desired physical properties of vinyl flooring. Vinyl flooring product structures may include single layer products such as vinyl composition tile (VCT) and sheet and tile structures containing more than one layer. In some products, a high performance coating is utilized on the surface of the structure comprising PVC to impart improved scratch resistance.

Most layers of vinyl flooring products also include a plasticizer material to soften and allow processing of the PVC resin. Some liquid polyesters have found limited utility as plasticizers for PVC resins. Plasticizers contribute little to the strength properties of the final PVC layer after processing.

Typically, low molecular weight, liquid esters of aromatic acids such as phthalates and benzoates are utilized as plasticizers in flooring compositions. These plasticizers have enough volatility to be considered Volatile Organic Components in some clean air environments. The phthalate esters in particular are also suspect from an environmental/health perspective due to their possible biological activity.

One high volume, commercial vinyl tile product, VCT, typically comprises plasticizer and a blend of PVC homo-polymer and PVC co-polymer, e.g. vinyl acetate, as binders in the composition. The vinyl acetate co-polymer allows the composition to be melt when mixed in the low intensity mixers typically used in VCT manufacturing. The PVC compositions are typically heated to less than about 150° C. in tile processes utilizing such equipment. Another issue is that the vinyl acetate PVC co-polymer is currently in tight supply.

Recently, the US Green Building Council has established the LEED (Leadership in Energy and Environmental Design) system for scoring points for new commercial construction (Table 1). Under the LEED system, flooring can be used to obtain points if it contains 10% by weight of or more of post-industrial recycle material.

TABLE 1

LEED System For New Commercial Construction

| Rating System | LEED-NC Version 2.1 | Rating System | LEED-EB Version 2.0 |
| --- | --- | --- | --- |
| MR Credit 4.1 1 Point | 5% wt = (post-consumer + ½ post-industrial) | MR Credit 2.1 1 Point | 10% (Post-Consumer materials), or |
| MR Credit 4.2 1 Point | 10% wt = (post-consumer + ½ post-industrial) | | 20% (Post-Industrial materials) |
| MR Credit 6 1 Point | 5% wt = (rapidly renewable building materials and products) | MR Credit 2.5 1 Point | 50% (Rapidly renewable materials) |

NC: New Construction; EB: Existing Building; Minimum % wt for each point. The % for both NC and EB is weight percent. For NC 1 point is granted for at least 5% wt of the total of post-consumer and ½ post-industrial. A second point is granted for at least 10% wt of the total of post-consumer and ½ post-industrial. An additional point is granted for at least 5% wt of rapidly renewable building materials and products. For EB 1 point is granted for at least 10% wt post-consumer materials. A second point is granted for at least 20% wt of post-industrial materials. An additional point is granted for at least 50% wt of rapidly renewable materials.

There has been renewed market interest in giving preference to "greener" flooring products based upon this LEED System. The use of renewable materials is of high interest.

There remains a need to develop "greener" flooring products based upon existing product structures/processes, and available recycle or renewable materials. There also is a need to find a binder system for vinyl flooring products that eliminates low molecular weight plasticizers and the need for vinyl acetate co-polymers of PVC in some vinyl tile manufacturing processes.

A product having a biobased component, where the biobased component includes recycle polyester resin would be desirable in the art.

BRIEF DESCRIPTION OF THE INVENTION

In an exemplary embodiment, a product having a biobased component, where the biobased component includes recycle polyester resin. The recycle polyester resin includes polyethylene terephthalate, polybutylene terephthalate, or polypropylene terephthalate.

In another exemplary embodiment, a product having a biobased component where the biobased component includes a polyester resin. The polyester resin is the co-reaction product of an aliphatic polyester having renewable components and a recycle polyester resin. The recycle polyester resin is aromatic based and has a biobased content of at least about 5% by weight.

In another exemplary embodiment, a composition having a filler and a polymeric binder where the filler includes biobased inorganic filler or recycle thermoset resin based filler. The polymeric binder includes a biobased component and the biobased component includes recycle polyester resin having a biobased content of at least about 5% by weight.

A product is provided having at least one layer including a polymeric binder comprising a homo-polymer PVC resin and either a high molecular weight thermoplastic polyester resin or a highly viscous polyester resin. In some embodiments, the thermoplastic polyester resin or the highly viscous polyester resin has a number average molecular weight (Mn) of at least 5,000. In other embodiments the polyester resin or the highly viscous polyester resin has a molecular weight (Mn) of at least 10,000.

In some embodiments, the highly viscous polyester resin has a viscosity of at least 15,000 cps at 100° F. using a Brookfield viscosimeter. In other embodiments the highly viscous polyester resin has a viscosity of at least 35,000 cps at 100° F. using a Brookfield viscometer.

The polyester resin may be biodegradable, and/or may contain renewable components. In one embodiment, the polyester resin comprises at least 50% by weight of renewable components. In another embodiment, the polyester resin comprises greater than 80% by weight of renewable components. In yet another embodiment, the polyester resin may comprise essentially 100% by weight of renewable components. Additionally, in some embodiments the polyester resin comprises essentially 100% by weight of renewable and recycle components.

The polyesters may comprise aliphatic diacid and aliphatic diol components. In one embodiment, these components preferably come from renewable sources. In other embodiments, the polyester can comprise aromatic diacids and aliphatic diol components. In other embodiments, the polyester can comprise aliphatic diacids, aromatic diacid, and aliphatic diol components. The polyesters can be amorphous or crystalline/semi-crystalline in nature. In one embodiment the polyester is amorphous having a Tg at or below about 25° C. In other embodiments, the polyester may be crystalline and have a Tg at or below about 25° C. and a melt temperature (Tm) above about 25° C. In some embodiments, the Tm is above about 25° C. but below about 200° C. In yet another embodiment, the polyester may comprise branching.

In another embodiment, the polyester comprises the co-reaction product of a aliphatic high molecular weight polyester comprising renewable components and a recycle polyester resin. In some embodiments, the recycle polyester resin is aromatic based and includes polyethylene terephthalate, polybutylene terephthalate, and polypropylene terephthalate.

In one embodiment, the layer comprising homopolymer PVC and high molecular weight polyester further comprises a recycle or renewable filler. The product of the invention can be in the form of a sheet or tile structure. In some embodiments, the product is essentially a single layer structure, such as a VCT. In one embodiment, the product having a layer including a binder comprising homo-polymer PVC resin and thermoplastic, high molecular weight polyester resin also has sufficient recycle or renewable content to qualify for at least one point under the LEED system.

In another embodiment, a composition is provided including filler and a polymeric binder comprising at least one PVC homo-polymer resin and at least one thermoplastic, high molecular weight polyester resins having at least one renewable component, wherein the composition may be melt mixed in a low intensity mixer and processed into a layer.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Provided is a product having a biobased component where the biobased component includes recycle polyester resin. The recycle polyester resin includes polyethylene terephthalate, polybutylene terephthalate, or polypropylene terephthalate. The recycle polyester resin has a biobased content of at least about 5% by weight.

In one embodiment, the biobased component includes a polyester resin where the polyester resin is the co-reaction product of an aliphatic polyester having renewable components and a recycle polyester resin. The recycle polyester resin is aromatic based and includes polyethylene terephthalate, polybutylene terephthalate, or polypropylene terephthalate. The polyester resin has a biobased content of at least about 5% by weight.

In another embodiment, a composition is provided having a filler and a polymeric binder. The filler includes inorganic biobased filler or recycle thermoset resin based filler. The polymeric binder includes a biobased component where the biobased component includes a recycle polyester resin having a biobased content of at least about 5% by weight.

This invention includes a product having at least one layer including a polymeric binder comprising a homo-polymer PVC resin and a thermoplastic, high molecular weight polyester resin, wherein the polyester resin comprises at least one renewable component. The product can comprise sheet or tile products. The layer in these structures may be solid or foamed, and filled or unfilled. In some embodiments the layer comprises a transparent wear layer or wear layer component.

One particular well known example of a prior art flooring product is vinyl composition tile (VCT), as described by ASTM Specification 1066-04. While the present invention is intended for use in such tile, as the Specification and Examples describe, it will be obvious to one skilled in the art that the invention is also applicable to various other types of flooring, including tile products such as Type III solid vinyl tile, surface applied tile, and to sheet flooring products.

In one embodiment, the at least one layer comprises consolidated chips or particles having a binder comprising a homo-polymer PVC and a thermoplastic, high molecular weight polyester resin. In another embodiment, the layer is a homogeneous, melt processed layer having a binder comprising a homo-polymer PVC and a thermoplastic, high molecular weight polyester resin.

In one embodiment, the at least one layer comprises consolidated chips or particles having a binder comprising a homo-polymer PVC and a highly viscous polyester resin. In another embodiment, the layer is a homogeneous, melt processed layer having a binder comprising a homo-polymer PVC and a highly viscous polyester resin.

Unless the layer is transparent, it typically comprises a filler in addition to the polymeric binder. Limestone, talc, or other minerals are utilized as filler in PVC flooring. Interest in using recycle materials as fillers has increased due to "green" issues. Such recycle or renewable filler materials include those obtained from wood or plants. These include pecan shells, wood flour, saw dust, walnut shells, rice hulls, corn cob grit, and others. Additionally, ground shells from animals such as clams, coral, etc. are renewable inorganic fillers. Such renewable fillers contain biobased carbon in the form of carbonates. These can be considered post-industrial or renewable materials under the LEED System. Mineral fillers generated from post-industrial processes include limestone, quartz, ceramic powders, glass, fly ash, and concrete powder.

Recycle thermoset resin based fillers can also be employed. For example, powders produced by grinding thermoset polyester materials, such as products made from bulk molding compounds (BMC) or sheet molding compounds (SMC) can be post-industrial, as well as post-consumer materials. Another thermoset material of interest is recycled fillers made from Urea Formaldehyde thermoset resins. Depending upon the source, these materials can also be post-industrial or post-consumer. Another example includes ground, cured (cross-linked) rubber materials such as used in tires. These rubbers materials can be based on natural or synthetic rubbers, polyurethanes, or other well known thermoset rubber compositions.

Additionally, recycle thermoplastic resin based materials may be employed as fillers if they are incompatible with the PVC/polyester resin binder. For example, polyethylene, polypropylene, polystyrene, polycarbonate, acrylonitrile butadiene styrene, and thermoplastic rubbers maybe incompatible with the PVC/high molecular weight polyester binder. Such materials, if added as particulate will essentially function as fillers in these compositions. If the recycled thermoplastic resin is compatible with the binder, it may function as a binder and not as a filler in the composition. Compatibility may be dependent upon the processing conditions employed. Depending upon the source, these materials can be post-industrial or post-consumer.

In one embodiment, the layer comprises a recycle or renewable filler in addition to the PVC/high molecular weight polyester binder or highly viscous binder.

The thermoplastic, high molecular weight polyester resin has a number average Mn of at least 5,000, and in some embodiments the polyester resins have a Mn of at least 10,000. The polyesters may be biodegradable, and/or may contain renewable components. In one embodiment, the polyester comprises at least 50% by weight of renewable components. In another embodiment, the polyester comprises greater than 80% by weight of renewable components. In yet another embodiment, the polyester comprises essentially 100% by weight of renewable components (Example 4).

In one embodiment, the polyesters may comprise aliphatic diacid and aliphatic diol components. Although a wide range of aliphatic diacids and aliphatic diols may be used, it is preferred that these components come from renewable sources. Renewable aliphatic diacid and aliphatic diol components may include but are not limited to Bio-PDO (1,3-propanediol), 1,4-butanediol, sebacic acid, succinic acid, adipic acid, azelaic acid, glycerin, and citric acid.

The polyesters may be pre-reacted with epoxidized natural oils, or the reaction can occur during the melt processing into layers. Such reaction during melt processing is a type of dynamic vulcanization. Dynamic vulcanization is the process of intimate melt mixing of two or more reactive components, such as an acid-terminated polyester and epoxidized natural oil, and the reaction occurs between at least two of these components during the melt mixing.

Other diacid and diol components from renewable resources will become available as the need for renewable materials continues to grow. The diol components may also include diols which are branched or hindered to limit crystallinity in the final polyester binder. These can include neopentyl glycol, glycerin, and others.

Renewable components based on plants, animals, or biomass processes have a different radioactive $C^{14}$ signature than those produced from petroleum. These renewable, biobased materials have carbon that comes from contemporary (non-fossil) biological sources. A more detailed description of biobased materials is described in a paper by Ramani Narayan, "Biobased & Biodegradable Polymer Materials: Rationale, Drivers, and Technology Exemplars", presented at American Chemical Society Symposium, San Diego 2005; American Chemical Society Publication #939, June 2006. The Biobased Content is defined as the amount of biobased carbon in the material or product as fraction weight (mass) or percent weight (mass) of the total organic carbon in the material or product. ASTM D6866 (2005) describes a test method for determining Biobased Content.

Theoretical Biobased Content was calculated for the resultant polyester resins in Table 2 and Table 3. In one embodiment the Biobased Content is at least 5% by weight. In another embodiment the Biobased Content is at least 50% by weight. In still another embodiment the Biobased Content is at least 80% by weight.

In another embodiment, the thermoplastic, high molecular weight polyesters or the highly viscous polyesters can comprise aromatic diacid components and aliphatic diol components. The aromatic acid components may include but are not limited to phthalic acid (anhydride), isophthalic, or terephthalic acids. In some cases an amount of trimellitic anhydride can also be used.

In another embodiment, the thermoplastic, high molecular weight polyesters may comprise aliphatic diacid and aromatic diacid components reacted with various aliphatic diols.

The thermoplastic, high molecular weight polyesters may also be branched. For example utilizing aliphatic alcohols that have more than two functional groups, such as glycerin, or aromatic acids having more than two functional groups such as trimellitic anhydride may be used to produce branched polyesters.

Although, the above diacid components are described, it is understood that their simple diesters such as from methanol or ethanol can be used to prepare the thermoplastic, high molecular weight polyesters or highly viscous polyesters via known transesterification techniques.

Depending upon the diacid and diol selected, polyesters can be amorphous or crystalline/semi-crystalline materials. In one embodiment, the polyester is amorphous. Table 2 shows some examples of amorphous polyester binders of the invention and their weight % renewable components.

TABLE 2

Compositions of Amorphous Polyesters With Renewable Content

| Trade Name | Ex-1 Amt (g) | Ex-2 Amt (g) | Ex-3 Amt (g) | Ex-4 Amt (g) | Ex-5 Amt (g) | Ex-6 Amt (g) |
| --- | --- | --- | --- | --- | --- | --- |
| 1,3-Propanediol | 367.60 | 380.88 | 381.80 | 372.21 | 370.19 | 357.65 |
| Isophthalic acid | 545.99 | 232.94 | 233.50 | 292.68 | 291.08 | 218.72 |
| Phthalic anhydride | 85.90 | 385.69 | 208.18 | 269.94 | 259.52 | 195.01 |
| Adipic acid | 0 | 0 | 176.03 | 0 | 0 | 0 |
| Azelaic acid | 0 | 0 | 0 | 73.66 | 0 | 0 |
| Sebacic acid | 0 | 0 | 0 | 0 | 78.71 | 228.13 |
| Dibutytin bis-lauryl mercaptide (T-20) catalyst | 0.50 | 0.50 | 0.50 | 0.50 | 0.50 | 0.50 |

TABLE 2-continued

Compositions of Amorphous Polyesters With Renewable Content

| Trade Name | Ex-1 Amt (g) | Ex-2 Amt (g) | Ex-3 Amt (g) | Ex-4 Amt (g) | Ex-5 Amt (g) | Ex-6 Amt (g) |
|---|---|---|---|---|---|---|
| Biobased Content wt % | 27 | 27 | 47 | 34 | 36 | 53 |
| Wt % Renewable Content | 37 | 38 | 56 | 45 | 45 | 59 |
| Tg Differential Scanning Calorimetry (DSC) | 25° C. | 3° C. | −22° C. | −9° C. | −10° C. | −29° C. |

In another embodiment, the polyester is crystalline and comprises a Tg below about 25° C. and a crystalline melting temperature Tm greater than about 25° C. In yet another embodiment, the polyester has a Tg at or below about 25° C. and a Tm between about 25° C. and about 200° C. Table 3 shows some examples of polyesters having a Tg at or below about 25° C. and Tm above about 25° C. Tg and Tm were determined by standard Differential Scanning Calorimetry (DSC) techniques. The polyester compositions include modifying 100% renewable aliphatic polyesters by the addition of an amount of aromatic diacid, such as terephthalic acid, to help control crystalline regions and Tm.

elevated temperature using a very slight excess of diacid (See Procedure 1B). After all the hydroxyl groups are reacted, a high vacuum is applied to build molecular weight. The mechanism by which high molecular weight is achieved is not clear. Table 4 shows some examples of polyesters comprising renewable components and the number average molecular weights obtained from these processes of Procedure 1.

Another method for obtaining high molecular weight polyesters involves the co-reaction of a renewable polyester with recycle polyesters such as PET (polyethylene

TABLE 3

Compositions of Crystalline Polyesters With Renewable Content

| Ingredient | Ex-7 | Ex-8 | Ex-9 | Ex-10 | Ex-11 | Ex-12 | Ex-13 |
|---|---|---|---|---|---|---|---|
| Glycerin | 25 | | | | | 24 | |
| Phthalic anhydride | | | 62 | 67 | 387 | | |
| 1,3-Propanediol | 510 | 238 | 138 | 258 | 241 | 228 | 334 |
| Trimellitic anhydride | | | | | 122 | | |
| Sebacic acid | 1130 | 281 | | | | 538 | |
| Isophthalic acid | | | | | | | 765 |
| Terephthalic acid | 232 | 231 | 394 | 425 | | 110 | |
| 1,6-Hexanediol | | | 156 | | | | |
| T-20 Catalyst | 3.8 | 1.8 | 1.5 | 1.5 | 1.5 | 1.8 | 0.5 |
| Tg ° C. | −21 | −35 | 7 | 25 | 22 | −41 | 2 |
| Tm ° C. | 122 | 125 | 135 | 197 | 77 | 40 | 141 |
| Wt % Renewable Content of starting material | 88 | 69 | 18 | 34 | 32 | 85 | 33 |
| Biobased Content wt % | 85 | 67 | 13 | 27 | 26 | 87 | 27 |

The high molecular weight polyesters may be prepared by several known methods. One method involves esterification of a diacid and a diol components at elevated temperature. Typically, a slight excess of diol is employed (see Procedure 1). After the acid functional groups have essentially reacted, a high vacuum is applied and excess diol is stripped off during transesterification, thereby increasing molecular weight. In some embodiments, 1,3-PDO is the diol of choice to build high molecular weight in this step of the process.

It has been found that high molecular weight polyester resin can be made by esterification of a diacid and diol at terephthalate), PBT (polybutylene terephthalate), PPT (polypropylene terephthalate) or other recycle polyester resins. In these co-reactions an aliphatic polyester comprising renewable ingredients was first prepared as described in Procedure 1. The recycle polyester resin was then mixed with the aliphatic polyester and transesterification between the two polyesters was accomplished at high temperature and preferably under high vacuum. In one embodiment, the co-reacted polyester had a Tm at or below about 150.degree. C. that could be processed in low intensity mixers. See Example 2.

TABLE 4

High Molecular Weight Polyester Compositions Having Renewable Content

| Ingredient | Ex-14 | Ex-7 | Ex-12 | Ex-15 | Ex-16 | Ex-17 | Ex-18 |
|---|---|---|---|---|---|---|---|
| Glycerin | | 25 | 24 | | 1.53 | 1.53 | |
| Phthalic anhydride | 159 | | | 133 | 4 | | 91 |
| 1,3-Propanediol | 212 | 510 | 228 | 199 | 38 | 44 | 310 |
| Trimellitic anhydride | | | | | | | |
| Sebacic acid | 84 | 1130 | 538 | 155 | 40 | 51 | 87 |
| Isophthalic acid | 416 | | | 347 | | | 508 |
| Terephthalic acid | | 232 | 110 | | 50 | 42 | |
| Neopentyl glycol | 124 | | | | 2 | | |
| Cyclohexane dimethanol | | | | 161 | | | |
| 1,6-Hexanediol | | | | | 9 | | |
| T-20 Catalyst | 5 | 3.8 | 1.8 | 5 | 0.4 | 0.4 | 5 |
| Molecular Weight Mn | 16,900 | 15,900 | 10,400 | 8,000 | 8,490 | 7,530 | 7,000 |

Molecular weight of the polyester resins was determined by Gel Permeation Chromatography (GPC) using the following procedure. The polyester resin was dissolved into tetrahydrofuran (THF), quantitatively diluting to about 30 mg/ml and filtering with a 0.45 micron filter. Two drops of toluene were added to each sample solution as an internal flow rate marker.

Samples soluble in THF were run by the following conditions. GPC analysis was run on the TriSec instrument using a four column bank of columns with pore sizes: $10^6$, 2 mixed D PLGel and 500 Angstroms. Three injections were made for the sample and calibration standards for statistical purposes. Universal Calibration (UC) GPC was used to determine MW. UC is a GPC technique that combines Refractive Index (RI) detection (conventional GPC) with Intrinsic Viscometry (IV) detection. Advantages of UC over conventional GPC are:

1. MW is absolute (not relative only to standards).
2. Yields information about branching of molecules.

The mobile phase for the THF soluble samples was THF at 1.0 ml/min. The data was processed using the Viscotek OmniSec UC software. The instrument is calibrated using a series of polystyrene narrow standards. To verify calibration, secondary standards were run. They include a 250,000 MW polystyrene broad standard, and a 90,000 MW PVC resin. The calculated molecular weight averages are defined as follows:

$$M_n = \frac{\sum (\text{Area}_i)}{\sum (\text{Area}_i)/(M_i)}$$

$$M_w = \frac{\sum [(\text{Area}_i) \times (M_i)]}{\sum (\text{Area}_i)}$$

$$M_z = \frac{\sum [(\text{Area}_i)^2 \times (M_i)]}{\sum [(\text{Area}_i) \times (M_i)]}$$

Area=The area of the $i^{th}$ slice of polymer distribution
$M_i$=The molecular weight of the $i^{th}$ slice of polymer distribution
Polydispersity (Pd)=a number value used to describe the molecular weight distribution and is obtained by $M_w/M_n$.

Highly crystalline or some high molecular weight samples insoluble in THF were dissolved in a 50/50 (wt.) mixture of tetrachloroethylene (TTCE)/phenol. The column set is $10^4$ and 500 Angstrom 50 cm Jordi columns. The mobile phase was 50/50 (wt.) mixture of TTCE/phenol at 0.3 ml/min. flow rate. The slower flow rate is due to the greater back pressure of the solvent system on the columns. The data was processed using the Viscotek UC OmniSec software.

Since MW data must be compared from one column set to the other, standards and selected samples were run on both column sets in THF for comparison. A calibration curve was made for each column set. There is good agreement of the standards between the two sets.

Products may be prepared by combining the homopolymer PVC resin and high molecular weight polyester resin or highly viscous polyester resin and heating to melt mix the resins and other formulation ingredients. The melt mixed formulation can then be formed into layers to create structures using processing methods known in the art, including but not limited to calendaring, extruding, casting, consolidating, and laminating. In some structures the layer may be homogeneous, and filled or unfilled depending upon its location and function within the structure. In other cases, the melt mixed formulation can be formed into chips or particles. These chips or particles can be further processed in many different ways to provide products. For example, they can be used to prepare layers comprising consolidated ships or particles, as known in commercial sheet and tile product structures.

The examples described below describe the formation of tile products utilizing traditional low intensity, "dough type" mixers. It is understood that the homo-polymer PVC and high molecular weight polyesters or highly viscous polyesters may be mixed using high intensity, "extruder type" mixers to process the formulations into products. The examples described below describe the formation of Vinyl Composition Tile (VCT) type products, but are not intended to limit the scope of the invention to these type products. The binder system comprising homo-polymer PVC resin and high molecular weight polyester resin or highly viscous polyester resin eliminates the need for co-polymer PVC resins, and low molecular weight, volatile plasticizers in these structures.

Procedure 1 Procedure for Preparation of High Molecular Weight Polyesters from Diacids and Diols 1A: This describes the general procedure utilized to make thermoplastic, high molecular weight polyesters from diacids and diols. A desired polyester formulation was developed based upon mole equivalent weight of the diacid and diol functional groups. An excess of diol of the most volatile diol component of the formulation was employed in the formulation. In one embodiment, 1,3-propanediol was the excess diol of choice. The diacid and diol ingredients were added into a stainless steel vessel of a RC1 automated reactor (Mettler-Toledo Inc, 1900 Polaris Parkway, Columbus, Ohio), stirred and heated under a continuous flow of pure, dry nitrogen. Typically, the ingredients were heated to 200° C. for 2 hours and temperature increased to 230° C. for an additional 4 to 6 hours until essentially all acid end groups were reacted and theoretical amount of water removed. Subsequently, the nitrogen was stopped and a high vacuum was applied. The mixture was heat and stirred under high vacuum for an additional 4 or more hours at 230° C. to 300° C. In some cases the temperature of the transesterification step was increased to 250° C. or higher. Depending upon the experiment, a vacuum in the range of 5 mm of mercury was utilized. Subsequently, the polymer was allowed to cool to 150° C. to 200° C. and physically removed from the reactor under a flow of nitrogen and allowed to cool to room temperature.

It is understood that removal of the volatile diol component during transesterification leads to high molecular weight. High molecular weight may be obtained faster if higher vacuum is utilized (below 1 mm of mercury). It is also known that as the melt viscosity increases due to increased molecular weight, the removal of diol becomes more difficult. The increase in molecular weight can become diffusion dependent because of the high viscosity of the molten polyester. This means that the released volatile diol from the transesterification reaction reacts back into the polymer before it can diffuse out of the melt, and be removed. Renewing the surface of the melt can facilitate the loss of diol and increase molecular weight. The polyesters obtained by this procedure generally have terminal hydroxyl end groups.

Although, diacid components are described above, it is understood that their simple diesters such as from methanol or ethanol can be used to prepare the thermoplastic polyester resin via known transesterification techniques. The polyesters from this procedure generally have ester terminated end groups.

1B: The same general procedure as in 1A is employed. A desired polyester formulation was developed based upon mole equivalent weight of the diacid and diol functional groups. An excess of about 0.01 to 0.5 mole excess of diacid was typically employed in the formulation. The ingredients were mixed and heated as in 1A above, except that the temperature was generally held below 200° C. to keep acid/anhydride from being removed until all hydroxyl groups were reacted. Subsequently, a high vacuum was applied as in 1A and the mixture heated to between 230° C. and 280° C. and stirred as in Procedure 1A. The resultant high molecular weight polyester was removed from the reactor and cooled as in 1A.

The mechanism of achieving high molecular weight is not clear. In some formulations containing phthalic anhydride, the phthalic anhydride was identified as being removed from the mixture under high vacuum.

Tables 5A to 5E provide additional examples of high molecular weight polyesters having renewable components made according to the procedure of Procedure 1.

TABLE 5A

| Raw Material Ingredient | Ex-19 Amt (g) | Ex-20 Amt (g) | Ex-21 Amt (g) | Ex-22 Amt (g) | Ex-23 Amt (g) | Ex-24 Amt (g) |
|---|---|---|---|---|---|---|
| 1,3-Propanediol | 380.88 | 383.65 | 378.15 | 382.15 | 384.72 | 375.80 |
| Isophthalic acid | 232.94 | 167.59 | 297.34 | 210.34 | 164.70 | 206.85 |
| Phthalic anhydride | 385.69 | 448.26 | 324.01 | 348.28 | 272.71 | 342.49 |
| Trimellitic anhydride | 0.00 | 0.00 | 0.00 | 0.00 | 0.00 | 0.00 |
| Adipic acid | 0 | 0 | 0 | 58.73 | 173.38 | 0.00 |
| Azelaic acid | 0 | 0 | 0 | 0 | 0 | 74.37 |
| T-20 | 0.50 | 0.50 | 0.50 | 0.50 | 0.50 | 0.50 |
| Tg (° C.) | −1° C. | −5° C. | 22° C. | −11° C. | −23° C. | 4° C. |

TABLE 5B

| Raw Material Ingredient | Ex-25 Amt (g) | Ex-26 Amt (g) | Ex-27 Amt (g) | Ex-28 Amt (g) |
|---|---|---|---|---|
| 1,3-Propanediol | 366.04 | 373.73 | 360.20 | 261.06 |
| Neopentyl glycol | 0 | 0 | 0 | 112.82 |
| Isophthalic acid | 156.70 | 205.71 | 154.20 | 294.12 |
| Phthalic anhydride | 259.46 | 340.60 | 255.33 | 112.38 |
| Azelaic acid | 217 | 0 | 0 | 0 |
| Sebacic acid | 0 | 79.47 | 229.77 | 219.12 |
| T-20 | 0.50 | 0.50 | 0.50 | 0.50 |
| Tg (° C.) | −12° C | −12° C | −29° C | −21° C |

TABLE 5C

| Ingredient | Ex-29 Amt (g) | Ex-30 Amt (g) | Ex-31 Amt (g) | Ex-32 Amt (g) | Ex-33 Amt (g) | Ex-34 Amt (g) | Ex-35 Amt (g) | Ex-36 Amt (g) |
|---|---|---|---|---|---|---|---|---|
| 1,3-Propanediol | 185.83 | 180.60 | 293.74 | 302.88 | 283.02 | 285.36 | 268.32 | 262.57 |
| Neopentyl glycol | 108.93 | 105.92 | 0 | 0 | 0 | 0 | 0 | 0 |
| Isophthalic acid | 365.30 | 276.13 | 288.72 | 231.54 | 278.18 | 218.15 | 263.73 | 200.73 |
| Phthalic anhydride | 268.82 | 231.12 | 257.41 | 206.44 | 248.01 | 194.49 | 235.14 | 178.96 |
| Succinic acid | 0 | 0 | 159.63 | 258.64 | 0 | 0 | 0 | 0 |
| Adipic acid | 0 | 0 | 0 | 0 | 190.29 | 301.51 | 0 | 0 |
| Azelaic acid | 0 | 0 | 0 | 0 | 0 | 0 | 232.31 | 357.24 |
| Sebacic acid | 70.56 | 205.73 | 0 | 0 | 0 | 0 | 0 | 0 |
| T-20 | 0.50 | 0.50 | 0.50 | 0.50 | 0.50 | 0.50 | 0.50 | 0.50 |

TABLE 5D

| Ingredient | Ex-2 Amt (g) | Ex-37 Amt (g) | Ex-38 Amt (g) | Ex-3 Amt (g) | Ex-4 Amt (g) | Ex-39 Amt (g) |
|---|---|---|---|---|---|---|
| 1,3-Propanediol | 380.88 | 363.80 | 378.45 | 381.80 | 372.21 | 363.39 |
| Isophthalic acid | 232.94 | 635.70 | 297.58 | 233.50 | 292.68 | 222.24 |
| Phthalic anhydride | 385.69 | 0 | 265.31 | 208.18 | 260.94 | 198.14 |
| Adipic acid | 0 | 0 | 58.16 | 176.03 | 0 | 0 |
| Azelaic acid | 0 | 0 | 0 | 0 | 73.66 | 215.74 |
| T-20 | 0.50 | 0.50 | 0.50 | 0.50 | 0.50 | 0.50 |

TABLE 5E

| Ingredient | Ex-5 Amt (g) | Ex-6 Amt (g) | Ex-40 Amt (g) | Ex-41 Amt (g) | Ex-41 Amt (g) |
|---|---|---|---|---|---|
| 1,3-Propanediol | 370.19 | 357.65 | 0 | 269.12 | 261.06 |
| 1,6 Hexanediol | 0 | 0 | 590.32 | 0 | 0 |
| Neopentyl glycol | 0 | 0 | 0 | 116.30 | 112.82 |
| Isophthalic acid | 291.08 | 218.72 | 0 | 389.83 | 294.12 |
| Phthalic anhydride | 0 | 0 | 252.26 | 0 | 0 |
| Trimellitic anhydride | 0 | 0 | 252.26 | 0 | 0 |
| Sebacic acid | 78.71 | 228.13 | 0 | 75.30 | 219.12 |
| T-20 | 0.50 | 0.50 | 0 | 0.50 | 0.50 |

Example 2

Preparation of High Molecular Weight Polyesters by Co-Reaction with Recycle Crystalline Polyesters The following formulation was processed as per Procedure 1 to prepare the aliphatic polyester EX-43 comprising 100% renewable components and a Biobased Content of 100%.

|  | EX-43 |
|---|---|
| 1,4-Butanediol | 400.5 |
| Sebacic acid | 600 |
| T-20 Catalyst | 0.4 |

The aliphatic polyester EX-43 was mixed with PET bottle recycle resin obtained from Nicos Polymers & Grinding of Nazareth, Pa., and catalyst added as listed below.

|  | EX-44 Amt (g) |
|---|---|
| PET recycle bottle | 100 |
| EX-43 | 100 |
| T-20 Catalyst | 0.13 |

The mixture was heated under nitrogen at 265° C. for a period of about 3 hours, and a high vacuum applied as in Procedure 1 for an additional 3 hours at 265° C. Subsequently, the resultant polyester having 50% by weight of renewable content and 50% by weight of recycle content was shown to have a Mn of 17,200 with a Tg of −9° C. and a Tm of 114° C. Mn of the starting PET recycle bottle resin was determined by GPC techniques described above and found to be 14,000. A sample of PET film obtained from Nicos Polymers & Grinding was also analyzed by GPC and Mn determined to be 17,300.

Example 3

Examples of Polyesters Made by Transesterification Between High Molecular Weight Aliphatic, Renewable Polyesters and Recycle Polyester Resin High molecular weight polyesters comprising the compositions of Table 6A were made according to Procedure 1.

TABLE 6A

|  | Azelaic Acid Amt (g) | 1,4-Butanediol Amt (g) | Sebacic Acid Amt (g) | T-20 Amt (g) | Total Amt (g) |
|---|---|---|---|---|---|
| Ex-45 | 511 | 489 |  | 0.4 | 1000 |
| Ex-46 | 582 | 417.6 |  | 0.4 | 1000 |
| Ex-47 |  | 400.5 | 600 | 0.4 | 1001 |
| Ex-48 |  | 471.2 | 528 | 0.4 | 1000 |
| Ex-43 | 674 | 325.74 |  | 0.5 | 1000 |
| Ex-49 |  | 354 | 529 | 0.4 | 883 |

The polyesters of Table 6A, were each mixed with recycle PET bottle resin obtained from Nicos Polymers & Grinding of Nazareth, Pa., and 0.1% T-20 catalyst added and transesterification conducted as per Example 2. In some examples, transesterification was also carried out on PBT resin Celanex 1600A obtained from Ticona (formerly Hoechst Celanese Corp.), Summit, N.J. Table 6B shows some of the resultant polyester co-reaction products and their Tm. It is obvious that these transesterification reactions may be carried out on virgin PET or PBT type resin.

TABLE 6B

| PE Transesterification Rxn # | Polyester ID used in Transesterification Rxn | Recycled Bottle PET | PBT Celanex | PB Azelate | Ecoflex FBX7011 | PB Sebacate | melt range (° C.) trans product | Mid-point mp (Tm) ° C. |
|---|---|---|---|---|---|---|---|---|
| Nicos Scrap PET |  |  |  |  |  |  | 255-259 | 256 |
| Ex-50 | Ex-45 | 70 |  | 30 |  |  | 138-154 | 145 |
| Ex-51 | Ex-46 | 50 |  | 50 |  |  | 84.5-104.8 | 94.9 |
| Ex-52 | Ex-46 | 70 |  | 30 |  |  | 140-159 | 146 |
| Ex-53 | Ex-47 | 50 |  |  |  | 50 | 99-126 | 102.9 |
| Ex-54 | Ex-47 | 70 |  |  |  | 30 | 155-170 | 160 |
| Ex-55 | Ex-48 | 50 |  |  |  | 50 | 101-125 | 109 |
| Ex-56 | Ex-48 | 70 |  |  |  | 30 | 149-156 | 151 |
| Ex-57 | Ex-43 | 50 |  | 50 |  |  | 100-111 | 105 |
| Ex-58 | Ex-43 | 70 |  | 30 |  |  | 133-141 | 136 |
| Ex-59 | Ex-49 | 50 |  |  |  | 50 | 92-106 | 97 |
| Ex-60 | Ex-49 | 70 |  |  |  | 30 | 110-170 | 140 |
| Ex-61 | Ex-45 |  | 75 | 75 |  |  | 135-141 | 137 |
| Ex-62 | Ex-49 |  | 75 |  |  | 75 | 145-166 | 156 |
| Ex-63 | Ex-47 | 180 |  |  |  | 120 | 79-153 | 87 |
| Ex-64 | Ex-43 | 180 | 120 |  |  |  | 73-108 | 79 |
| Ex-65 | Ecoflex FXB7011 | 180 |  |  | 120 |  | 122-158 | 137 |

The melting points listed in Table 6B were determined using an "Optimelt" automated unit. Higher Tm co-reacted polyesters may be produced by using less aliphatic polyester than described in the Table 6B above.

Example 4

Preparation of Vinyl Composition Type Tile having a Binder Comprising PVC Homo-Polymer Resin and Highly Viscous Polyester Resin

This is an example of VCT flooring product prepared with a binder comprising homopolymer PVC and an amorphous, thermoplastic, high molecular weight polyester resin. The following VCT formulation, comprising homopolymer PVC and high molecular weight polyester resin Ex-6 of Table 2, was mixed using a low intensity Baker Perkins heated mixer. The ingredients were added to the mixer which was heated to 325° F. The formulation was mixed and heated for approximately 7 to 11 minutes in the Baker Perkins mixer to a drop temperature of approximately 280° F. Depending upon the formulation, mixing time varied between 4 to 16 minutes on average and drop temperature varied between approximately 280° F. and 290° F.

The hot, mixed formulation was then dropped into the nip of a two roll calendar. The rolls of the calendar were set a different temperatures—one roll hotter than the other. Typically, the hot roll was set at about 290° F. and the cold roll set at about 250° F. The nip opening between the calendar rolls were set to provide a final sheet thickness of about 125 mils. The processability of the formulations were evaluated using the key described in Table 7A. As can be seen from the formulation and processing data sheet Table 7B, the formulation based upon homopolymer PVC and the high molecular weight polyester or highly viscous polyester processed very similar to a standard PVC formulation containing PVC copolymer and low molecular weight plasticizer.

TABLE 7A

Key for Baker Perkins and Mill Evaluations

Mix Appearance 1. very soft, wet, flowable mix
2. tough mix, dough like
3. soft mix, small beads
4. dry mix with some clumps
5. very dry powdery mix, no clumps
6. unmelted pellets/polyester Sheet Appearance 1. soft flexible sheet
2. smooth sheet
3. cracks in sheet and/or voids
4. ragged edges, uneven sheet thickness, wavy
5. lots of folds from being taken off with the blade Sheet Hot Strength 1. falls apart when removed from roll, powder
2. falls apart when removed from roll, small pieces or partial sheet
3. full sheet which falls apart under sheet weight
4. no stretch under sheet weight
5. slight stretch under sheet weight
6. sheet shrinks when pulled off the mill Roll Tack 1. sticks to a roll, all can't be removed with the blade
2. sticks to a roll, removed with the blade but not cleanly (chatter marks)
3. sticks to a roll, removed cleanly with the blade
4. material split between two rolls
5. material does not stick to either roll TABLE 7A-continued Key for Baker Perkins and Mill Evaluations Roll Residue 1. a lot
2. a little
3. none Self Feeding 1. yes
2. marginal
3. no

TABLE 7B

Formulation And Processing Data Sheet

| Ingredient | PVC Control Amt (g) | EX-79 Amt (g) |
|---|---|---|
| PVC Homopolymer | 104.49 | 104.49 |
| PVC Copolymer | 34.83 | 0 |
| Phthalic Plasticizer | 48.43 | 0 |
| Ca Stabilizer | 2.76 | 2.78 |
| Filler (Limestone) | 1012.21 | 1012.21 |
| Pigment (TiO2) | 7.48 | 7.26 |
| EX-6 | 0 | 83.26 |
| Total | 1210 | 1210 |
| Wt % Filled | 84.25% | 84.25% |
| Mixer Temp ° F. | 324 | 327 |
| Batch Time (min) | 11-32 | 7-11 |
| Mix Drop Temp ° F. | 280-284 | 276-283 |
| East Roll Set Pressure psi | 70 | 72 |
| West Roll Set Pressure psi | 24 | 28 |
| East Roll Temp ° F. | 290 | 288 |
| West Roll Temp ° F. | 245 | 255 |
| Gap Setting | 2.09 | 2.09 |
| Sheet Thickness | 122-125 | 122-125 |
| Mix Appearance | 4 | 4, 2 |
| Sheet Appearance | 2 | 2 |
| Sheet Hot Strength | 4 | 4 |
| Roll Tack | 3 | 3 |
| Roll Residue | 3 | 3 |
| Self Feeding | 1 | 1 |

The final calendered sheet was removed from the calendar and cut into tile and physical properties determined. The tile comprising PVC homo-polymer and highly viscous polyester binder met the VCT ASTM 1066 standards for indentation, static load and impact resistance.

Example 5

Preparation of Vinyl Composition Type Tile Having a Binder Comprising PVC Homo-Polymer Resin and Thermoplastic, High Molecular Weight Polyester Resin

This is an example of a flooring product having a binder comprising homopolymer PVC resin and a totally aliphatic, thermoplastic, high molecular weight polyester resin. The following formulation was processed as per Procedure 1 to prepare the aliphatic polyester EX-80 comprising 100% renewable components. The polyester had a Tg of −16° C. and a Tm of 62° C.

| Trade Name | EX-80 |
|---|---|
| Azelaic acid | 510.8 |
| 1,4, Butanediol | 489 |
| Dibutyltin bis-lauryl mercaptide | 0.40 |

The following VCT formulation, comprising homopolymer PVC and high molecular weight polyester resin EX-80 was mixed using a low intensity Baker Perkins heated mixer as described in Example 4. The following formulation and processing data sheet Table 7 documents that the formulation processed acceptably. The final calendered sheet was removed from the calendar and cut into tile and physical properties determined. The Tile comprising PVC homopolymer and thermoplastic, high molecular weight polyester EX-80 binder met the VCT ASTM 1066 standards for indentation.

TABLE 8

Formulation And Processing Data Sheet

| Ingredient | EX-81 Amt (g) |
|---|---|
| PVC Homopolymer | 94.985 |
| Ca Stabilizer | 2.53 |
| Filler (Limestone) | 920.194 |
| Pigment (TiO2) | 6.6 |
| Polyester EX-80 | 76 |
| Total | 1100 |
| Wt % Filled | 84.2 |
| East Mixer Temp ° F. | 324 |
| West Mixer Temp ° F. | 325 |
| Batch Time (min) | 13 |
| Mix Drop Temp ° F. | 282 |
| East Roll Set Pressure psi | 72 |
| West Roll Set Pressure psi | 24 |
| East Roll Temp ° F. | 289 |
| West Roll Temp ° F. | 250 |
| Gap Setting | 2.01 |
| Sheet Thickness | 125 |
| Mix Appearance | 3 |
| Sheet Appearance | 2 |
| Sheet Hot Strength | 4 |
| Roll Tack | 3 |
| Roll Residue | 3 |
| Self Feeding | 2 |

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A flooring product comprising a filler and a polymeric binder, wherein the polymeric binder comprises:
    a PVC resin, and
    a polyester comprising an amorphous high molecular weight polyester and an amorphous highly viscous polyester, wherein the polyester is the reaction product of an aliphatic diacid component, an aromatic diacid component, and an aliphatic diol component, wherein the aliphatic diacid is selected from the group consisting of sebacic acid, succinic acid, adipic acid, and azelaic acid and wherein the aliphatic diol component is selected from 1,3-propanediol, 1,4-butanediol and 1,6 hexanediol,
    wherein the polymeric binder is substantially free of semi-crystalline polyester, and wherein the polymeric binder is substantially free of a low molecular weight plasticizer.

2. The flooring product of claim 1 wherein the polymer binder comprises a PVC homopolymer and a highly viscous polyester.

3. The flooring product of claim 1 wherein the aliphatic diol component is biobased component.

4. The flooring product of claim 1 wherein the aliphatic diacid component is biobased component.

5. The flooring product of claim 1 wherein the aliphatic diol and aliphatic diacid components are biobased components.

6. The flooring product of claim 1 wherein the polyester has a number average molecular weight of at least 5,000.

7. A flooring product comprising a filler and a polymeric binder, wherein the polymeric binder comprises:
    a PVC resin, and
    a polyester comprising an amorphous high molecular weight polyester and an amorphous highly viscous polyester, wherein the polyester is the reaction product of an aliphatic diacid component, an aromatic diacid component, and an aliphatic diol component, wherein the aromatic diacid is selected from the group consisting of isophthalic acid, phthalic acid, and phthalic anhydride and wherein the aliphatic diol component is selected from 1,3-propanediol, 1,4-butanediol, and 1,6-hexanediol,
    wherein the polymeric binder is substantially free of semi-crystalline polyester, and wherein the polymeric binder is substantially free of a low molecular weight plasticizer.

8. The flooring product of claim 7 wherein the polymer binder comprises a PVC homopolymer and a highly viscous polyester.

9. The flooring product of claim 7 wherein the aliphatic diol component is biobased component.

10. The flooring product of claim 7 wherein the aliphatic diacid component is biobased component.

11. The flooring product of claim 7 wherein the aliphatic diol and aliphatic diacid components are biobased components.

12. The flooring product of claim 7 wherein the polyester has a number average molecular weight of at least 5,000.

13. A flooring product comprising a filler and a polymeric binder, wherein the polymeric binder comprises:
    a PVC resin, and
    an amorphous polyester comprising that is a reaction product of:
        an aliphatic diacid component selected from the group consisting of sebacic acid, succinic acid, adipic acid, and azelaic acid,
        an aromatic diacid component selected from isophthalic acid, phthalic acid, and phthalic anhydride, and
        an aliphatic diol component selected from 1,3-propanediol, 1,4-butanediol, and 1,6-hexanediol, and
    wherein the polymeric binder is substantially free of semi-crystalline polyester.

14. The flooring product of claim 1, wherein the aromatic diacid includes one or more compounds selected from isophthalic acid, phthalic acid, and phthalic anhydride.

15. The flooring product of claim 7, wherein the aliphatic diacid includes one or more compounds selected from sebacic acid, succinic acid, adipic acid, and azelaic acid.

* * * * *